US012033649B2

(12) United States Patent
Cengarle et al.

(10) Patent No.: US 12,033,649 B2
(45) Date of Patent: Jul. 9, 2024

(54) NOISE FLOOR ESTIMATION AND NOISE REDUCTION

(71) Applicant: DOLBY INTERNATIONAL AB, Amsterdam (NL)

(72) Inventors: Giulio Cengarle, Barcelona (ES); Antonio Mateos Sole, Barcelona (ES); Davide Scaini, Barcelona (ES)

(73) Assignee: DOLBY INTERNATIONAL AB, Dublin (IE)

( * ) Notice: Subject to any disclaimer, the term of this patent is extended or adjusted under 35 U.S.C. 154(b) by 246 days.

(21) Appl. No.: 17/793,539

(22) PCT Filed: Jan. 18, 2021

(86) PCT No.: PCT/EP2021/050921
§ 371 (c)(1),
(2) Date: Jul. 18, 2022

(87) PCT Pub. No.: WO2021/148342
PCT Pub. Date: Jul. 29, 2021

(65) Prior Publication Data

US 2023/0081633 A1 Mar. 16, 2023

Related U.S. Application Data

(60) Provisional application No. 63/117,313, filed on Nov. 23, 2020, provisional application No. 63/000,223, filed on Mar. 26, 2020.

(30) Foreign Application Priority Data

Jan. 21, 2020 (ES) .............................. ES202030040

(51) Int. Cl.
*G10L 21/02* (2013.01)

(52) U.S. Cl.
CPC .................................. *G10L 21/02* (2013.01)

(58) Field of Classification Search
CPC ............................. G10L 21/02; G10L 21/028
(Continued)

(56) References Cited

U.S. PATENT DOCUMENTS 5,579,431 A 11/1996 Reaves
2007/0083365 A1* 4/2007 Shmunk ............. G10L 21/0272 704/232

(Continued)

FOREIGN PATENT DOCUMENTS

EP 1794749 B1 * 3/2014 ......... G10L 21/0208
JP 2019003087 A 1/2019
WO 2006114100 A1 11/2006

OTHER PUBLICATIONS

Garcia, Guillermo "Automatic denoising for musical audio restoration. Stanford University" 2009.

(Continued)

*Primary Examiner* — James K Mooney

(57) ABSTRACT

Embodiments are disclosed for noise floor estimation and noise reduction, In an embodiment, a method comprises: obtaining an audio signal; dividing the audio signal into a plurality of buffers; determining time-frequency samples for each buffer of the audio signal; for each buffer and for each frequency, determining a median (or mean) and a measure of an amount of variation of energy based on the samples in the buffer and samples in neighboring buffers that together span a specified time range of the audio signal; combining the median (or mean) and the measure of the amount of variation of energy into a cost function; for each frequency: determining a signal energy of a particular buffer of the audio signal that corresponds to a minimum value of the cost function; selecting the signal energy as the estimated noise (Continued)

floor of the audio signal; and reducing, using the estimated noise floor, noise in the audio signal.

20 Claims, 9 Drawing Sheets

(58) Field of Classification Search
USPC .................................................. 381/56, 94.1
See application file for complete search history.

(56) References Cited

U.S. PATENT DOCUMENTS

| | | | |
|---|---|---|---|
| 2009/0163168 | A1 | 6/2009 | Andersen |
| 2011/0264447 | A1 | 10/2011 | Erik |
| 2014/0269375 | A1 | 9/2014 | Garcia |
| 2015/0030180 | A1 | 1/2015 | Sun |
| 2019/0385637 | A1 | 12/2019 | Khanagha |

OTHER PUBLICATIONS

Lumori, Mikaya, et al "Approximate ML Estimation of the Period and Spectral Content of Multiharmonic Signals Without User Interaction" IEEE transactions on Instrumentation and Measurement, vol. 61, No. 11, Nov. 1, 2012. pp. 2953-2959.
Yeh, C. (2008) Multiple Fundamental Frequency Estimation of Polyphonic Recordings. Ph.D. thesis, University Paris 6.
Z. Zhang, K. Honda and J. Wei, "Retrieving Vocal-Tract Resonance and anti-Resonance From High-Pitched Vowels Using a Rahmonic Subtraction Technique," ICASSP 2020-2020 IEEE International Conference on Acoustics, Speech and Signal Processing (ICASSP), Barcelona, Spain, 2020, pp. 7359-7363.

* cited by examiner

NOISE FLOOR ESTIMATION AND NOISE REDUCTION

CROSS-REFERENCE TO RELATED APPLICATIONS

This application claims priority of the following priority applications: ES application P202030040 (reference: D19149ES), filed 21 Jan. 2020, U.S. provisional application 63/000,223 (reference: D19149USP1), filed 26 Mar. 2020 and U.S. provisional application 63/117,313 (reference: D19149USP2), filed 23 Nov. 2020, which are hereby incorporated by reference.

TECHNICAL FIELD

This disclosure relates generally to audio signal processing.

BACKGROUND

Unlike professional scenarios, background noise is a potential problem in user-generated audio content (UGC), due to the limitations of the equipment used and the uncontrolled acoustic environment where the recordings take place. Such background noise, besides being annoying, might be made even louder by processing tools, which apply a significant amount of dynamic range compression and equalization to the audio content. Noise reduction is therefore a key element of the audio processing chain to reduce background noise. Noise reduction relies on a successful measurement of a noise floor, which may be obtained by analyzing the power spectrum of a fragment of the recording that contains only background noise. Such a fragment could be identified manually by the user, it could be found automatically, or it could be obtained by asking performers/speakers to be quiet during the first few seconds of the recording. There are, however, scenarios where a fragment of audio content containing only noise is not available.

Existing approaches based on finding a quiet fragment of audio (either manually or automatically) fail in the case where no such fragment exists, for example because the signal is present at different times at different frequencies. Other approaches are based on fitting the audio frequency spectrum with a smooth curve that passes through the minima. Such methods usually discard the narrow-band tonal components of the noise, such as electric hum. Other methods based on computing the distribution of levels at each frequency and selecting a low percentile of the distribution (e.g., the 10% percentile) as noise, are not robust to, for example, fade in and fade out of the signal. Finally, other methods rely on assumptions about the nature of the signal (e.g., assuming the signal is speech) and therefore do not generalize to all types of audio signals.

SUMMARY

Implementations are disclosed for noise floor estimation and noise reduction.

In an embodiment, a method comprises: obtaining an audio signal; dividing the audio signal into a plurality of buffers; determining time-frequency samples for each buffer of the audio signal; for each buffer and for each frequency, determining a median and a measure of an amount of variation of energy based on the samples in the buffer and samples in neighboring buffers that together span a specified time range of the audio signal; combining the median and the measure of the amount of variation of energy into a cost function; for each frequency: determining a signal energy of a particular buffer of the audio signal that corresponds to a minimum value of the cost function; selecting the signal energy as the estimated noise floor of the audio signal; and reducing, using the estimated noise floor, noise in the audio signal.

In an embodiment, a mean is determined instead of the median.

In an embodiment, the measure of the amount of variation and median or mean are scaled between 0.0 and 1.0.

In an embodiment, the combination of the amount of variation and mean or median is the sum of their values plus an inverse of the sum of their product and 1.

In an embodiment, the combination of the amount of variation and the median or mean is the sum of their square values.

In an embodiment, the combination of the amount of variation and median or mean is the sum of the square of the median or mean and a sigmoid of a variance of the energy.

In an embodiment, the combination of the amount of variation and median or mean is the sum of the median or mean and a sigmoid of the variance.

In an embodiment, the amount of variation is replaced with a difference between a maximum value of the energy across the buffers in the specified time range and a minimum value of the energy across the buffers in the specified time range.

In an embodiment, buffers having a median or mean and variance computed on chunks of the audio signal comprise at least one buffer where the overall signal energy is below a predefined threshold and the at least one buffer is not used in estimating the noise floor of the audio signal.

In an embodiment, the predefined threshold is determined relative to a maximum level of the audio signal.

In an embodiment, the predefined threshold is determined relative to an average level of the audio signal.

In an embodiment, the method further comprises: analyzing, using the one or more processors, a distribution of chunks of the audio signal from which the noise floor is estimated at each frequency; selecting a chunk k and a frequency f; and replacing an estimated noise at the frequency f with a value computed from chunk k if the increased cost is smaller than a second predefined threshold.

In an embodiment, the method further comprises determining a confidence value from a value of the amount of variation of energy at the selected buffer.

In an embodiment, the confidence value is smoothed across frequency

In an embodiment, reducing noise in the audio signal, further comprises applying a gain reduction at each frequency that is reduced as a function of the confidence value at the frequency.

In an embodiment, the method further comprises: selecting, using the one or more processors, a frequency $f_1$; computing, using the one or more processors, averages of discrete derivatives of the frequency spectrum in blocks of predefined size for all intervals of a predetermined size above the selected frequency $f_1$; selecting, using the one or more processors, a block with a largest negative derivative as a cut-of frequency $f_c$, if such negative value is smaller than a predefined value; and replacing, using the one or more processors, values of the frequency spectrum above the cut-off frequency with an average of the frequency spectrum in a frequency band of predefined length having an upper boundary that is adjacent to the cut-off frequency.

In an embodiment, the cost function increases for increasing median or mean and increases for an increasing measure of the amount of variation of energy.

In an embodiment, the cost function is non-linear.

In an embodiment, the cost function is symmetric in the measure of the amount of variation of energy and mean or median.

In an embodiment, the cost function is asymmetric, and the measure of the amount of variation of energy is weighted less than the mean or median when the measure of the amount of variation of energy is smaller than a predefined threshold.

In an embodiment, a system comprises: one or more processors; and a non-transitory computer-readable medium storing instructions that, upon execution by the one or more processors, cause the one or more processors to perform operations of any one of the methods described above.

In an embodiment, a non-transitory, computer-readable medium stores instructions that, upon execution by one or more processors, cause the one or more processors to perform operations of any one of the methods described above.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. In cases where a reliable estimate of a noise floor of an audio signal is not available (e.g., a fragment of background noise only), the disclosed system and method can be used to estimate the noise floor. Unlike existing solutions, the disclosed system and method do not discard narrow-band tonal components of the audio signal (e.g., electric hum) and are robust to, for example, fade in and fade out of the audio signal. Also, no assumptions of the nature of the audio signal are needed, allowing the disclosed system and method to be applied to all types of audio signals.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

System Overview

The disclosed embodiments find, for every frequency of an audio signal (e.g., and audio file or stream), a fragment of the audio recording where the energy is smaller than in other fragments of the audio recording, and the variance of the energy is reasonably small within such fragment. The energy of such fragment at the frequency of interest is taken as the level of the steady noise at this frequency. At each frequency, the choice of a suitable fragment is framed as a minimization problem, where fragments with low energy and low variance are favored, thus finding the best compromise between the two independent variables. If at a certain frequency, the level identified as the noise floor corresponds to a relatively high variance, a small confidence is associated to such frequency. The value of the confidence is used to inform a subsequent noise reduction unit so the gain attenuation applied to suppress the noise is reduced according to the confidence value, allowing a conservative approach where potentially inaccurate noise estimation does not negatively impact the quality of the output of the noise reduction. In cases where the noise floor has a large drop at high frequencies (e.g., typically due to band limiting in lossy codecs), the value of the estimated noise before the falloff is held until the end of the spectrum to avoid reduction of attenuation gains due to their smoothing across frequency around the falloff region.

Figure 1:
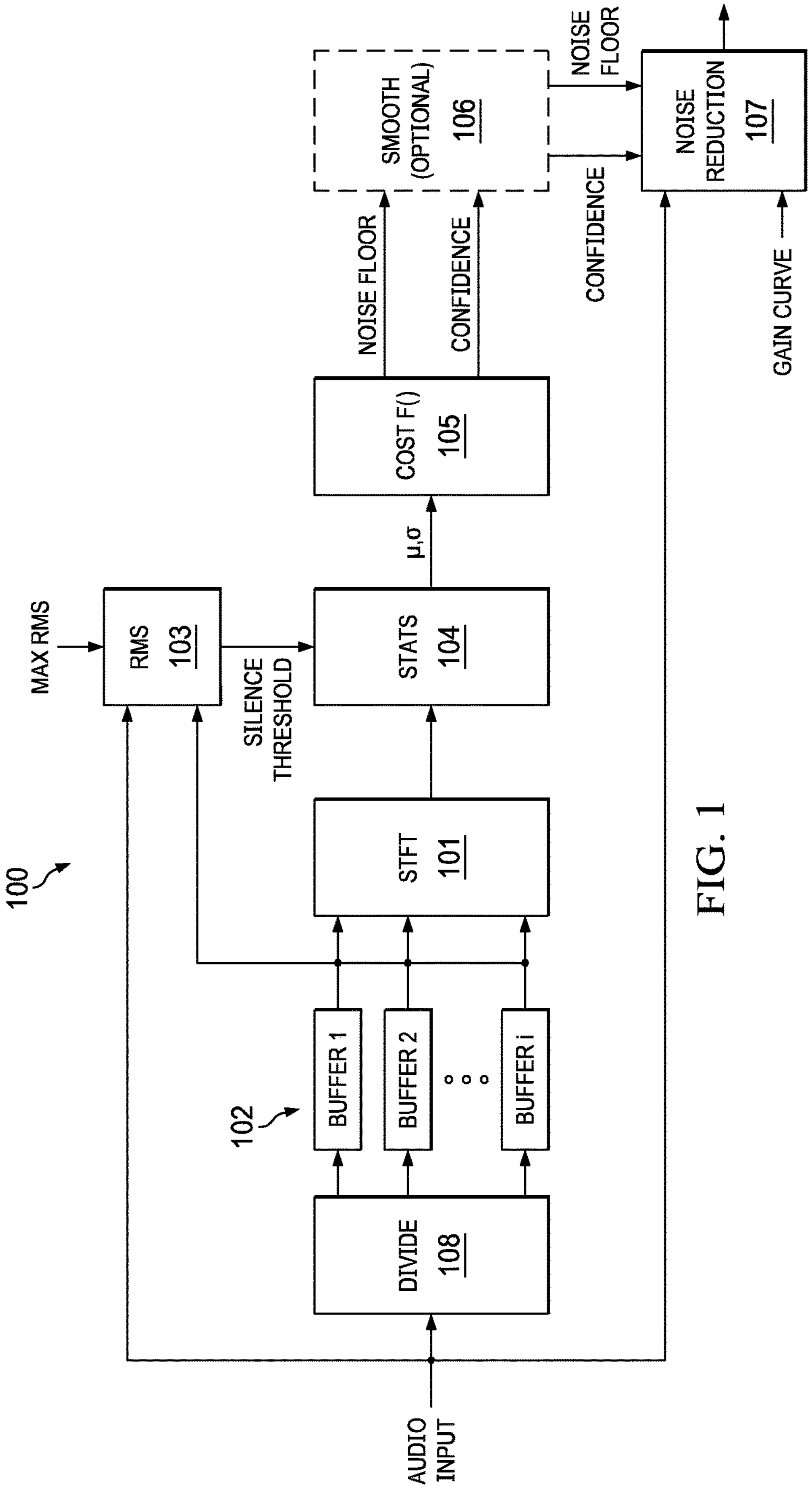
FIG. 1 is a block diagram of a system for noise floor estimation and noise reduction, according to an embodiment.

FIG. 1 is a block diagram of a system 100 for noise floor estimation and noise reduction, according to an embodiment. System 100 includes spectrum generating unit 101, buffers 102, root mean square (RMS) calculator 103, statistical analysis unit 104 ("STATS"), cost function unit 105, optional smoothing unit 106, noise reduction unit 107 and dividing unit 108.

In an embodiment, an input audio signal x(t) (e.g., an audio file or stream) is divided into a plurality of buffers 102 by dividing unit 108, each buffer comprising N samples (e.g., 4096 samples) with Y percentage overlap with adjacent buffers (e.g., 50% overlap) at Z kHz sampling rate (e.g., 48 kHz). Spectrum generating unit 101 applies a frequency transformation to the contents of the plurality of buffers 102 to obtain the time-frequency representation X(n, f) comprising buffers of M frequency bins (e.g., 4096 samples) at Z kHz sampling rate (e.g., 48 kHz). For example, 4096 samples, 50% overlap and a 48 kHz sampling rate results in a frequency resolution of about 12 Hz for each buffer. In some embodiments, the frequency transformation is a short-time Fourier transform (STFT), which outputs time-frequency data (e.g., time-frequency tiles).

For each buffer i, RMS calculator 103 computes the RMS level for the buffer in the time domain and defines a silence threshold relative to a maximum RMS (e.g., −80 dB below the maximum RMS). The silence threshold is computed by analyzing the entire audio signal, and is therefore limited to an "offline" use case. Alternatively, the silence threshold is defined as a fixed number (e.g., −100 dBFS), or a fixed number that depends on the bit-depth of the input audio file/stream (e.g. −90 dBFS for 16-bit signals, and −140 dBFS for 24-bit signals). Silent buffers are those buffers that have an RMS level below the silence threshold.

For each frequency f and each buffer i, statistical analysis unit 104 computes a median and a measure of an amount of variation (e.g., standard deviation, variance, range (max-min), interquartile range) of the energy of samples in j buffers, where the j buffers belong to a chunk of the audio signal x(t) (e.g., 1 second of audio) centered around the buffer i. Equations [1] and [2] describe the operations of statistical analysis unit 104 using a median μ and standard deviation σ of the energy of samples in j buffers, as follows:

$$\mu(i,f)=\text{median}(20*\text{Log}(|X_i(j,f)|)), \quad [1]$$

$$\sigma(i,f)=\text{std}(20*\text{Log}(|X_i(j,f)|)). \quad [2]$$

Chunks of the audio signal containing one or more silent buffers (as determined by the silence threshold) are not used in the calculation of median and standard deviation. In some embodiments, the median can be replaced by the mean to reduce computational costs.

Figure 2A:
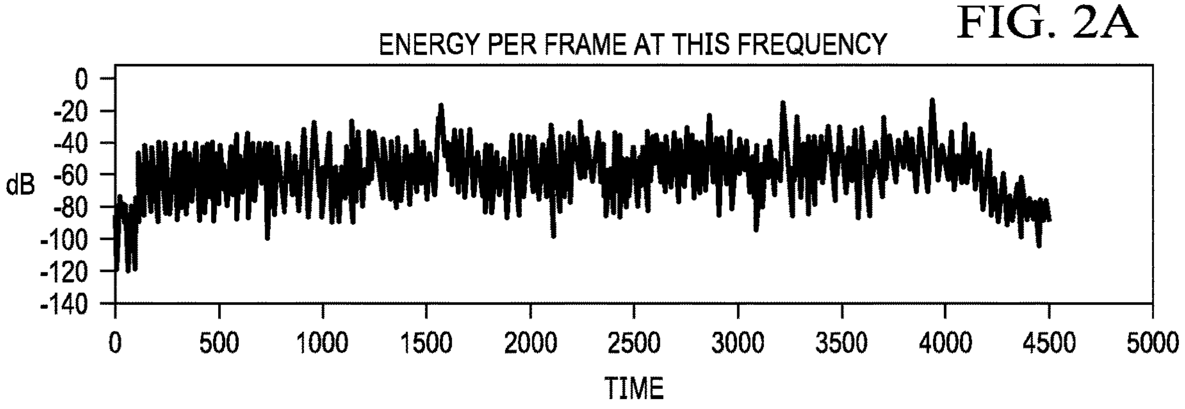
FIGS. 2A-2C are plots illustrating (from top to bottom) signal energy, median (μ) and standard deviation (σ) across buffers at a certain frequency, according to an embodiment.
Figure 2B:
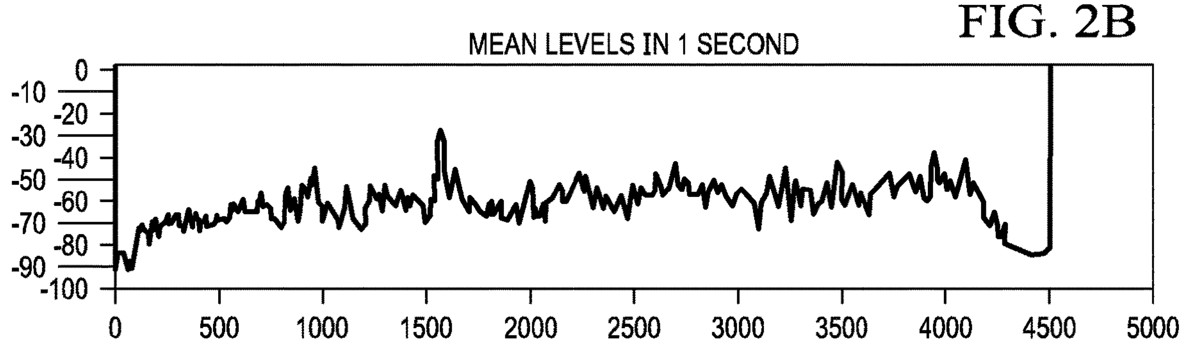
Figure 2C:
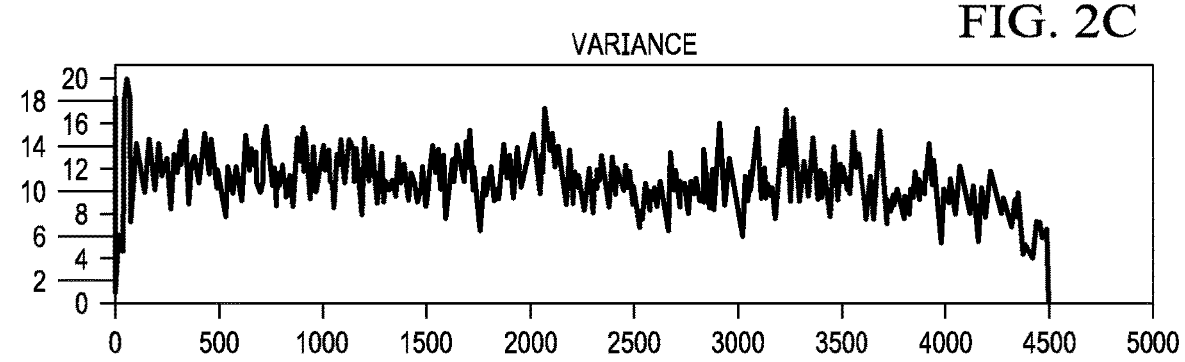

FIGS. 2A-2C are plots illustrating (from top to bottom) signal energy, median μ and standard deviation σ across buffers at a certain frequency, according to an embodiment. A goal is finding, at each frequency, the chunk of the audio signal that best represents the noise floor of the audio signal, i.e., where the medium/mean μ and standard deviation σ are small. Rather than introducing thresholds, cost function unit 105 computes a numerical joint minimization of a cost function J(μ(i, f), σ(i, f)), after rescaling μ and σ so that they fit the interval [0.0, 1.0], i.e., normalized:

$$J(i, f) = \frac{1}{1+\mu(i, f))\sigma(i, f)} + \mu(i, f) + \sigma(i, f). \quad [3]$$

Once the buffer k(f) corresponding to $\text{argmin}_i\{J(i, f)\}$ is determined, the noise floor of the audio file/stream is given equal to the median/mean of the buffer k:

$$\text{noise}(f)=\mu(k(f),f). \quad [4]$$

Figure 3:
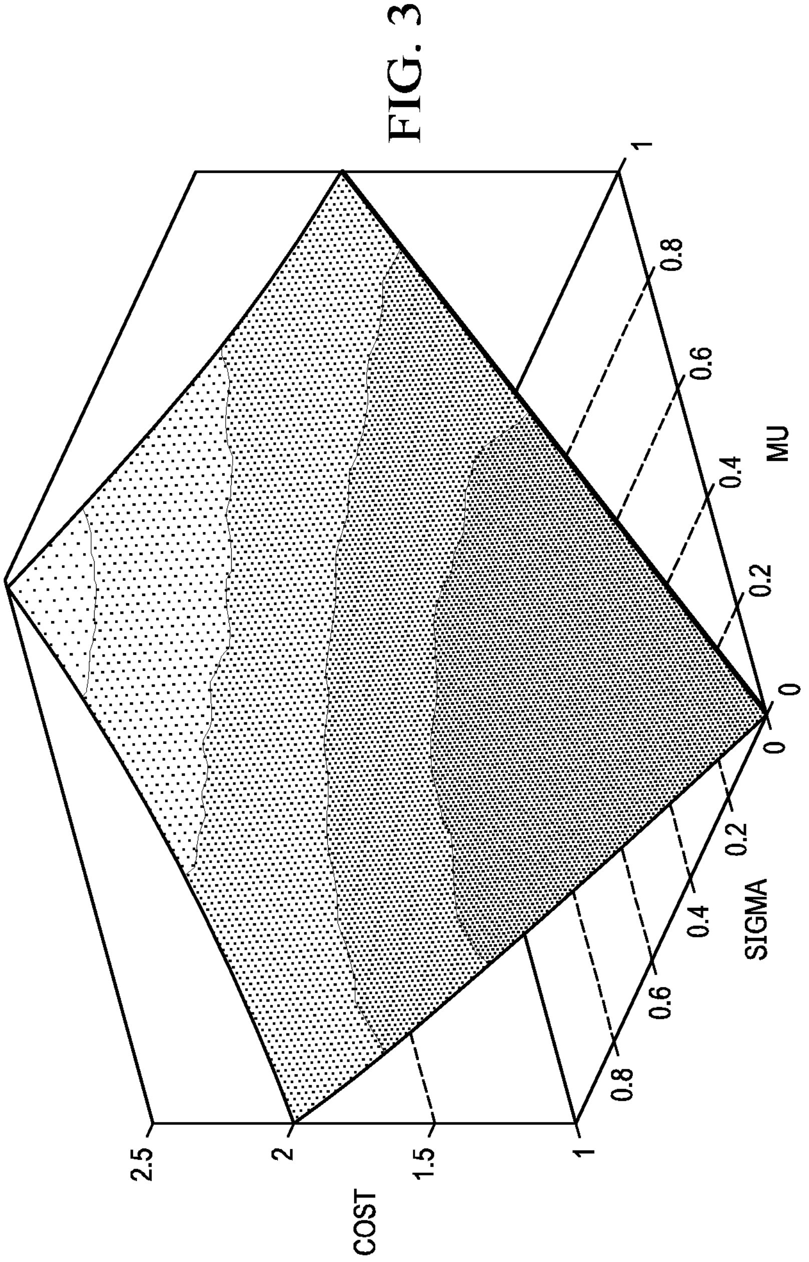
FIG. 3 illustrates a cost function of μ and σ, according to an embodiment.

The chunk of audio corresponding to the buffer k, which comprises some neighboring buffers of the buffer k is referred to as the selected chunk at frequency f. FIG. 3 illustrates the cost function of μ and σ according to Equation [3].

Note that rescaling μ and σ a posteriori requires obtaining their values for the whole audio file. If noise estimation is to be done online, while the file is being recorded or processed, the rescaling can be done by introducing a fixed range [$\mu_{max}$, $\mu_{min}$] and [$\sigma_{max}$, $\sigma_{min}$] for both variables based on previous empirical observations, so that the rescaled variables become:

$\mu(i,f)=0$, if $\mu(i,f)\leq\mu_{min}$ [5]

$\mu(i,f)=\mu(i,f)-\mu_{min})/(\mu_{max}-\mu_{min})$, if $\mu_{min}<\mu(i,f)<\mu_{max}$ [6]

$\mu(i,f)=1$, if $\mu(i,f)\geq\mu_{min}$. [7]

The rescaling of σ can be done in a similar manner using Equations [5]-[7], and substituting μ with σ.

In some embodiments, the following changes to the cost function are considered (still assuming μ and σ are rescaled to [0, 1], either a posteriori based on their max and min values, or online based on guessed max and min values). The cost function can be expressed with quadratic terms:

$$J(i,f)=\mu^2(i,f)+\sigma^2(i,f). \quad [8]$$

The respective role and importance of μ and σ can be changed, thus breaking the symmetry of the cost function. One approach is to transform σ so that it gives a small cost when it is below a certain threshold, and high cost above, with a smooth transition in between. This formulation would minimize J(i, f) for small values of σ. A possible implementation is using the sigmoid function shown in Equation [9]:

$$J(i, f) = \mu^2(i, f) + \frac{1}{1 + \exp(-\alpha(\sigma(i, f) - 0.5))^2}, \quad [9]$$

where α=10 is a good example scale factor for the sigmoid function.

In some embodiments, the quadratic term $\mu^2(i, f)$ can be replaced with a linear term μ(i, f) to give less weight to chunks with small level, thus avoiding potential underestimations.

It can be beneficial to favor noise estimation of neighboring frequencies to be selected from the same chunk of audio, to avoid occasional underestimated outliers in an otherwise very smooth noise curve. One embodiment for achieving this is by examining the distribution of selected chunks k(f) across frequencies, for example by visualizing the histogram of the position of selected chunks in the audio file. If one finds a large cluster on a certain chunk $\tilde{k}$ and few occasional outliers, it can be assumed that the chunk $\tilde{k}$ is mostly background noise, and estimation of outlier frequencies on the same chunk could be forced. For a frequency where the corresponding chunk is $k(f)=\tilde{k}$, the cost $J(\tilde{k}, f)$ can be computed and replace noise(f)=μ(k, f) with noise(f)=$\mu(\tilde{k}, f)$, if the cost increase is smaller than a certain threshold: $J(\tilde{k}, f)-J(k, f)<J_{Th}$. A slight variance of this rule is choosing the noise estimate corresponding to the smallest cost in a range of $n_k$ buffers around $\tilde{k}$, as long as the cost difference is smaller than $J_{Th}$.

Figure 4A:
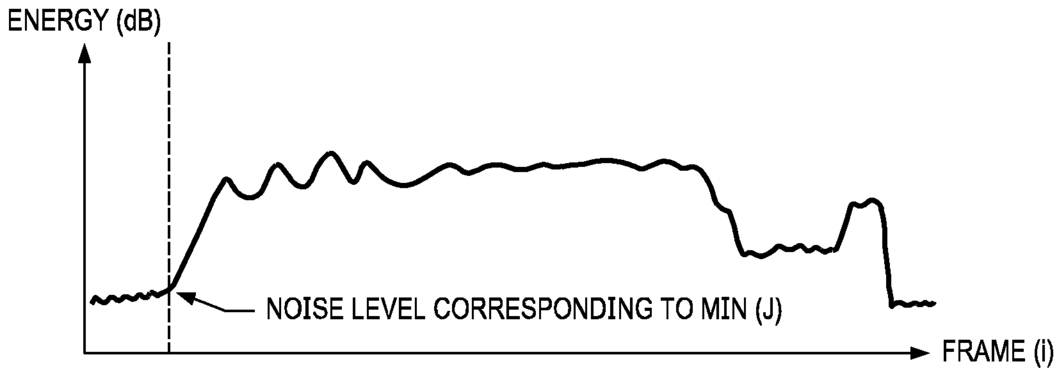
FIG. 4A illustrates an example energy level per buffer i at a given frequency f, highlighting the buffer corresponding to a minimum cost function J(i, f), according to an embodiment.
Figure 4B:
FIG. 4B illustrates an example medium value (μ) in dB for the buffer i and frequency f of FIG. 4A, according to an embodiment.
Figure 4C:
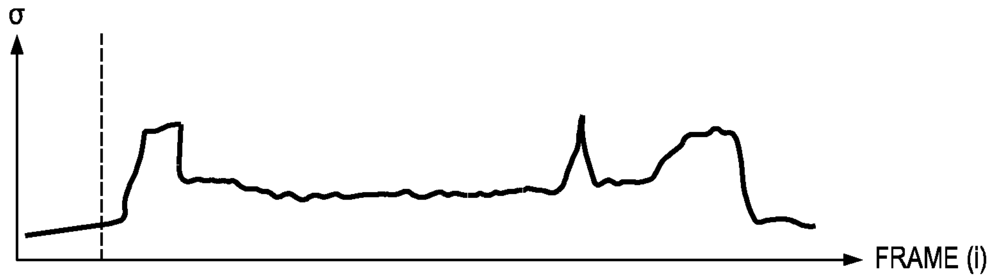
FIG. 4C illustrates an example standard deviation (σ) in dB for the buffer i and frequency f of FIG. 4A, according to an embodiment.
Figure 4D:
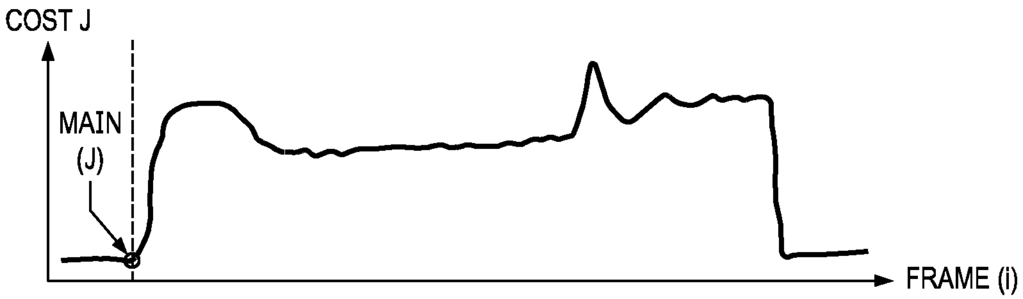
FIG. 4D illustrates an example minimum of the cost function J(i, f) for buffer i and frequency f, and highlights the buffer corresponding to $\mathrm{argmin}_i\{J(i, f)\}$, according to an embodiment.

FIG. 4A illustrates an example a noise level corresponding to the minimum of a cost function J(i, f) for a given buffer i and frequency f. FIG. 4B illustrates an example median/mean value (μ) in dB for the buffer i and frequency f. FIG. 4C illustrates an example standard deviation (σ) in dB for the buffer i and frequency f. FIG. 4D illustrates an example cost function J(i, f) for buffer i and frequency f, and the buffer $\text{argmin}_i\{J(i, f)\}$ where it reaches the minimum value.

In an embodiment, optional smoothing unit 106 applies smoothing to the estimated noise floor to avoid fluctuations that are due to estimating adjacent bins from different chunks of the audio signal. Smoothing unit 106 replaces each value of noise(f) with the average of the values in a band around f. The shape of such bands can be rectangular, triangular, etc. In some embodiments, smooth functions reaching values of 0 at the band boundaries can be used. For perceptual reasons, the width of the band is exponential and corresponds to a constant fraction of octave. In some embodiments, the constant fraction is 1/100, which is a very narrow bandwidth to preserve sufficient resolution for accurate measurement of noise components.

A confidence value c(f) representing how reliable is the estimation can be obtained from the value of σ(k), by associating small confidence to frequencies with high values of variance and vice-versa:

$$c(f) = 0, \text{ if } \sigma \geq \sigma_H, \quad [10]$$

$$c(f) = \frac{\sigma_H - \sigma}{\sigma_H - \sigma_L}, \text{ if } \sigma_L < \sigma < \sigma_H, \quad [11]$$

$$c(f) = 1, \text{ if } \sigma \leq \sigma_L. \quad [12]$$

Example values, empirically determined, are $\sigma_H$=14 and $\sigma_L$=7.5. The confidence can be used to inform noise reduction unit 107 about the accuracy of the noise floor estimation, therefore improving noise reduction to avoid undesired artifacts in frequencies where the estimation is not deemed accurate.

Figure 5A:
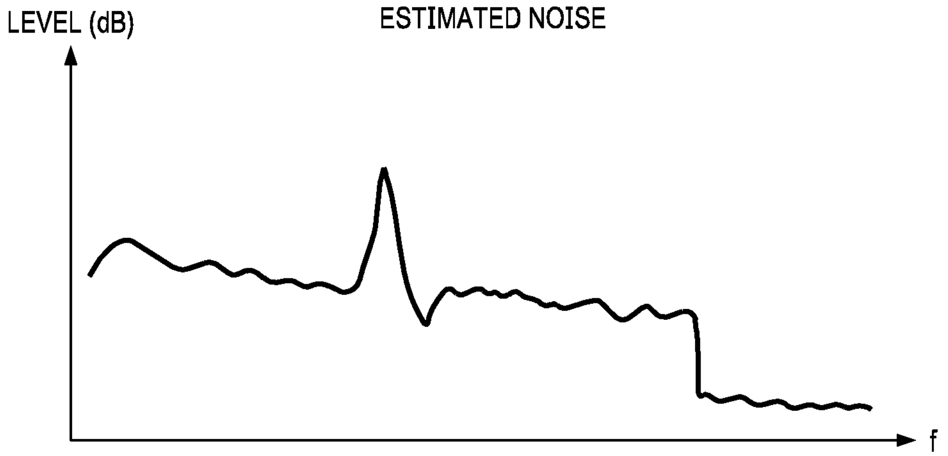
FIG. 5A illustrates an example estimated noise level (dB) as a function of frequency f, according to an embodiment.
Figure 5B:
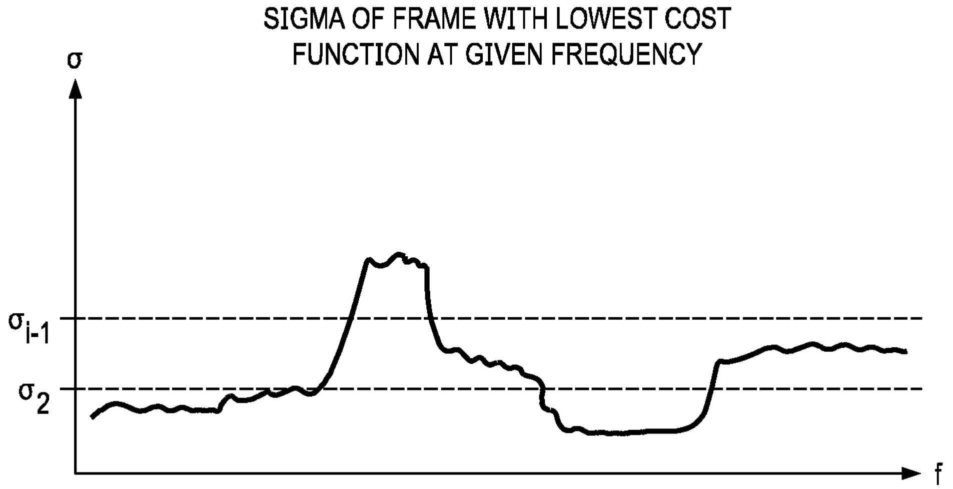
FIG. 5B illustrates an example standard deviation for the estimated noise that at each frequency f corresponds to the buffer with the lowest cost function at the given frequency according to an embodiment.
Figure 5C:
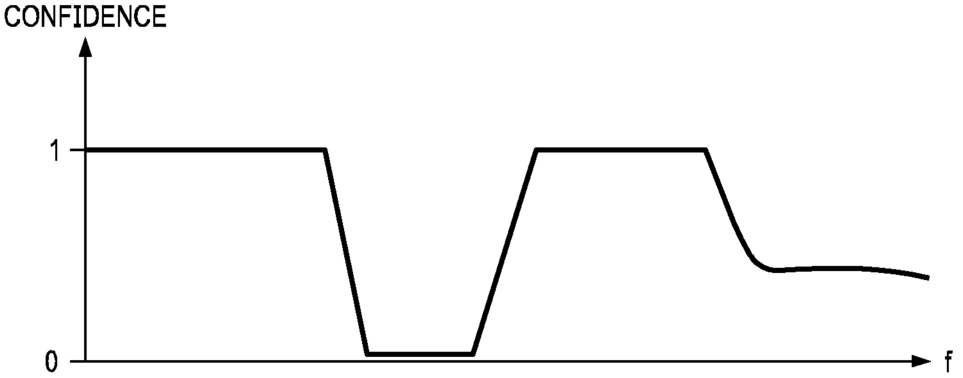
FIG. 5C shows the confidence in the noise estimation of FIG. 5A based on the standard deviation σ shown in FIG. 5B, according to an embodiment.

FIG. 5A illustrates an example estimated noise level (dB) as a function of frequency f. FIG. 5B illustrates an example standard deviation for the estimated noise shown in FIG. 5A that is the standard deviation of the buffer where the cost function has the lowest value at the given frequency f. FIG. 5C shows the confidence in the noise estimation of FIG. 5A based on the standard deviation a shown in FIG. 5B. Note that when σ is below $\sigma_L$, the confidence is 1, in accordance with Equation [12], and when σ is between $\sigma_L$ and $\sigma^H$ the confidence is given by $$c(f) = \frac{\sigma_H - \sigma}{\sigma_H - \sigma_L},$$

in accordance with Equation [11], and when σ is greater than $\sigma_H$ the confidence is 0, in accordance to Equation [10].

In an embodiment, noise reduction unit 107 is a frequency-band-based or FFT-based expander. At any given frame, frequency bins whose energy is close to the estimated noise floor are attenuated with a gain somewhat proportional to their proximity to the noise floor. In some embodiments, the gain attenuation G(n, f) is determined by L(n, f) using a curve similar to the one shown in FIG. 6 described below.

Specifically, let N(f) be the energy level of the noise in dB, and let S(n, f) be the energy level of the audio content at frame n and frequency f. In some embodiments, a threshold Th in decibels is defined, and the amount of level above the threshold is computed as:

$$L(n,f)=10\ \text{Log}(S(n,f))-(N(f)+Th). \quad [13]$$

Figure 6:
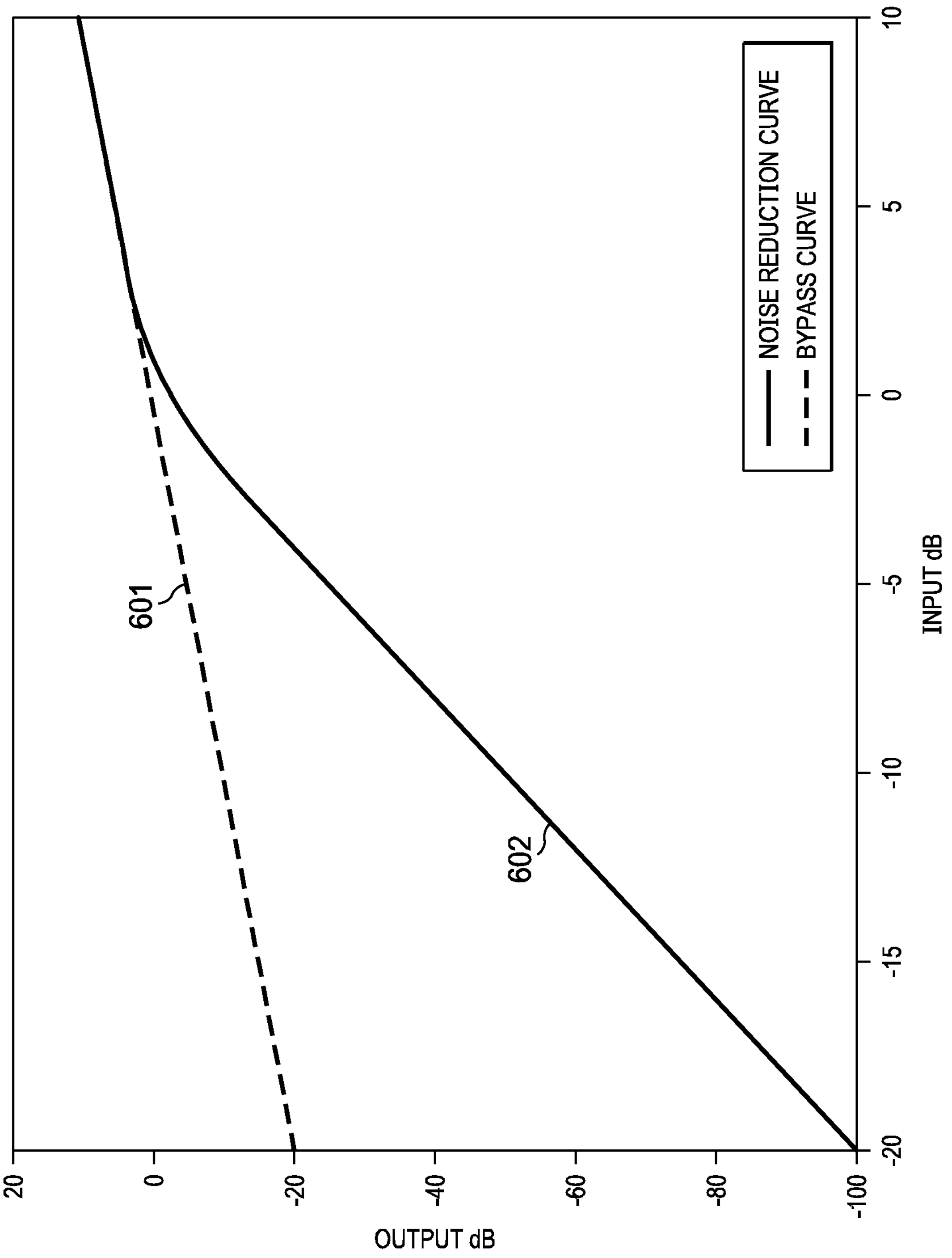
FIG. 6 illustrates a gain curve (transfer function) of noise reduction, according to an embodiment.

Referring to FIG. 6, a gain curve 601 (also referred to as "noise reduction curve") and a bypass curve 602 are shown. At a given input level (dB), the gain attenuation is the difference between the input level (x-axis) and the desired output level (dB) (y-axis). The gain curve 601 has a slope of 1 above threshold 603, a slope corresponding to a chosen ratio (e.g., usually 5 or greater) below the threshold point 603, and a smooth or sharp transition around the threshold point 603. When the confidence c(f) is provided by cost function unit 106, it is used by noise reduction unit 107 to reduce the effect of noise reduction in the frequencies where confidence is small, by scaling the gain reduction in decibels with the confidence:

$$G(i,f)=c(f)G(i,f). \quad [14]$$

In some embodiments, the confidence can also be smoothed by smoothing unit 105, thus ensuring a continuous transition between full noise reduction in bands with high confidence, and no noise reduction in bands with low confidence.

Figure 7A:
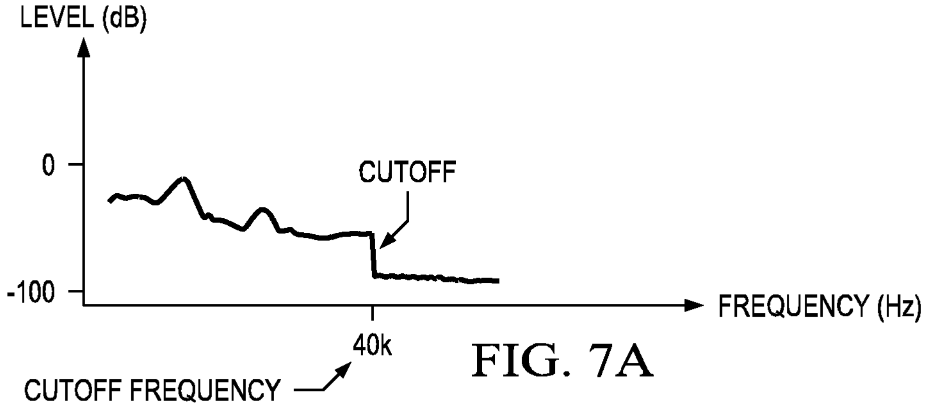
FIG. 7A illustrates a case where a noise floor has a large drop at high frequencies, according to an embodiment.

In cases where the noise floor has a large drop at high frequencies (e.g., typically due to band limiting in loss codecs) as shown in FIG. 7A, the value of the estimated noise before the falloff is held until the end of the spectrum. This is to avoid reduction of attenuation gains due to their smoothing across frequency around the falloff region.

Figure 7B:
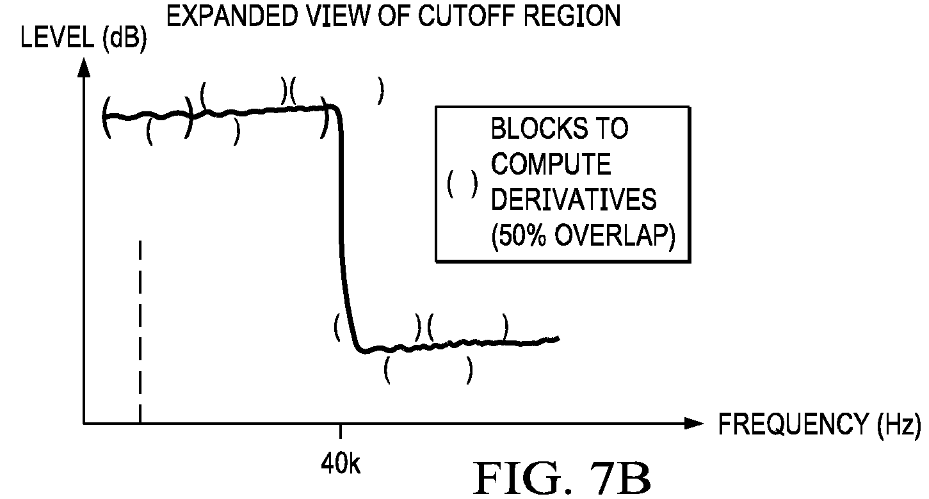
FIG. 7B illustrates dividing the noise spectrum shown in FIG. 7A above a frequency $f_1$ into blocks of length L points and a predefined overlap, and computing the average derivatives of the points in each block, ordered in increasing frequency of their corresponding blocks, according to an embodiment.
Figure 7C:
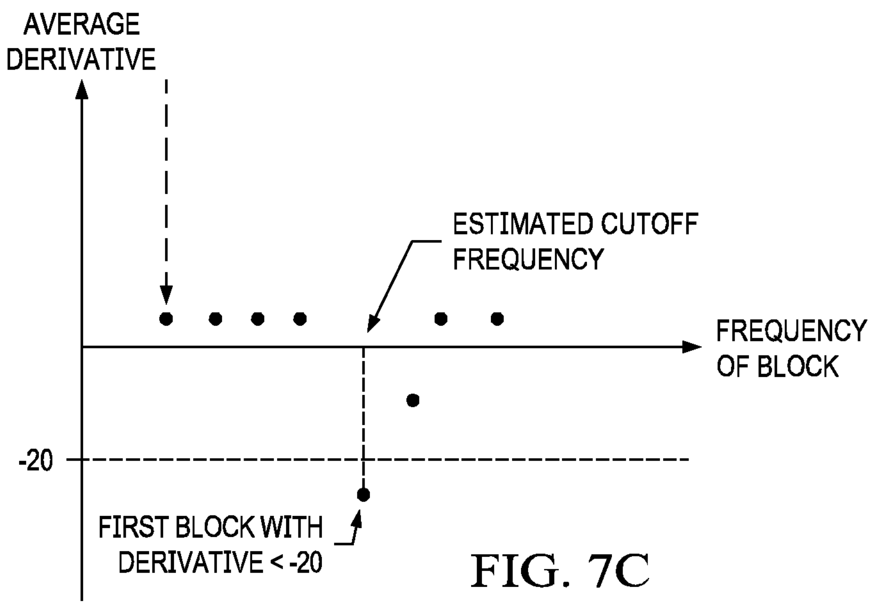
FIG. 7C illustrates finding the first average derivative that has a value larger than a predefined negative value, according to an embodiment.
Figure 7D:
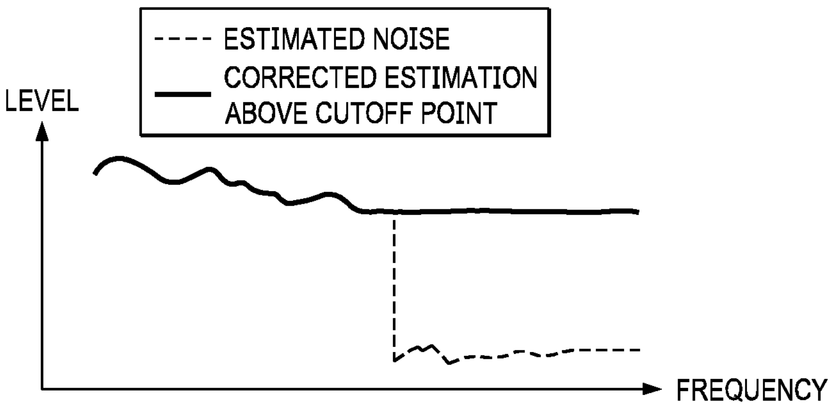
FIG. 7D illustrates computing an average of the noise spectrum in a small region before a cut-off frequency $f_c$ and replacing the values of the noise spectrum above $f_c$ with the average of the noise spectrum, according to an embodiment.

In some embodiments, the frequency of the falloff is determined by: 1) choosing a first frequency $f_1$ above which a cutoff frequency $f_c$ is to be estimated, as shown in FIG. 7A; 2) dividing the noise spectrum above $f_1$ into blocks of length L points and a predefined overlap (e.g., 50%), as shown in FIG. 7B; 3), and, in each block, computing the average derivatives, ordered in increasing frequency of their corresponding blocks, finding the first derivative that has a value smaller than a predefined negative value (e.g., −20 dB), as shown in FIG. 7C; and 4) computing the average of the noise spectrum $n_c$ in a small region before $f_c$ and replacing the values of the noise spectrum above $f_c$ with $n_c$, as shown in FIG. 7D. Note that step (3) is interpreted as a significant falloff on the spectrum, and the frequency of the corresponding block is considered the cutoff frequency $f_c$

Example Processes

Figure 8:
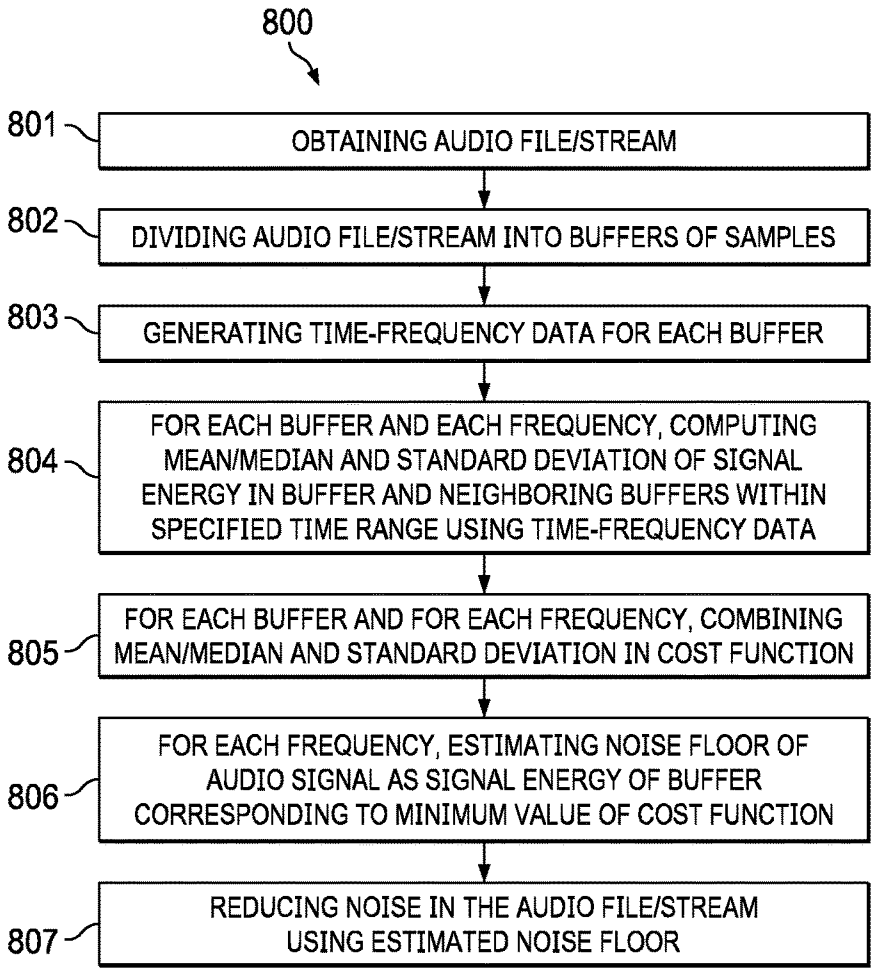
FIG. 8 is a flow diagram of a process for noise floor estimation and noise reduction, according to an embodiment

FIG. 8 is a flow diagram of a process 800 for noise floor estimation and noise reduction, according to an embodiment. Process 800 can be implemented using the device architecture shown in FIG. 8.

Process 800 begins by obtaining, using one or more processors, an audio signal (e.g., file, stream) (801), dividing the audio signal into a plurality of buffers (802), generating time-frequency samples for each buffer of the audio signal (803), as described in reference to FIGS. 1-7.

Process 800 continues by, for each buffer and for each frequency, determining a median (or mean) and a standard deviation of energy based on the energy in the samples in the buffer and samples in neighboring buffers that together span a specified time range of the audio signal (804), and combining the median and standard deviation into a cost function (805), as described in reference to FIGS. 1-7.

Process 800 continues by, for each frequency, estimating a noise floor of the audio signal as the signal energy of a particular buffer of the audio signal corresponding to a minimum value of the cost function (806), and reducing, using the estimated noise floor, noise in the audio signal (807), as described in reference to FIGS. 1-7.

Example System Architecture

Figure 9:
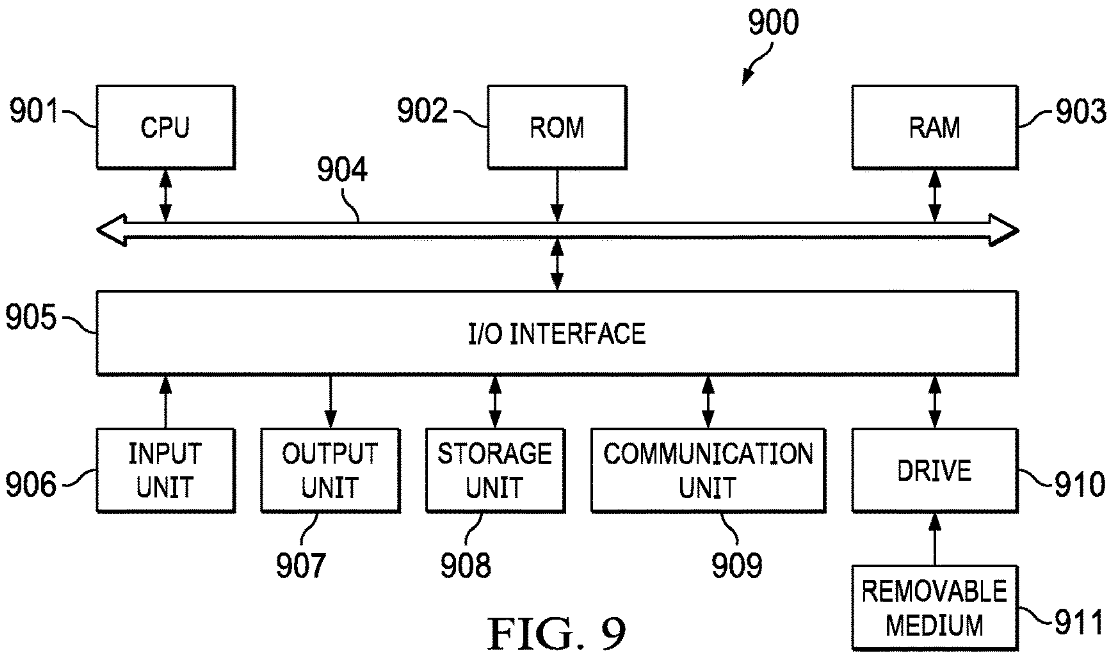
FIG. 9 shows a block diagram of an example system for implementing the features and processes described in reference to FIGS. 1-8, according to an embodiment.

FIG. 9 shows a block diagram of an example system for implementing the features and processes described in reference to FIGS. 1-8, according to an embodiment. System 900 includes any devices that are capable of playing audio, including but not limited to: smart phones, tablet computers, wearable computers, vehicle computers, game consoles, surround systems, kiosks.

As shown, the system 900 includes a central processing unit (CPU) 901 which is capable of performing various processes in accordance with a program stored in, for example, a read only memory (ROM) 902 or a program loaded from, for example, a storage unit 908 to a random access memory (RAM) 903. In the RAM 903, the data required when the CPU 901 performs the various processes is also stored, as required. The CPU 901, the ROM 902 and the RAM 903 are connected to one another via a bus 909. An input/output (I/O) interface 905 is also connected to the bus 904.

The following components are connected to the I/O interface 905: an input unit 906, that may include a keyboard, a mouse, or the like; an output unit 907 that may include a display such as a liquid crystal display (LCD) and one or more speakers; the storage unit 908 including a hard disk, or another suitable storage device; and a communication unit 909 including a network interface card such as a network card (e.g., wired or wireless).

In some implementations, the input unit 906 includes one or more microphones in different positions (depending on the host device) enabling capture of audio signals in various formats (e.g., mono, stereo, spatial, immersive, and other suitable formats).

In some implementations, the output unit 907 include systems with various number of speakers. As illustrated in FIG. 9, the output unit 907 (depending on the capabilities of the host device) can render audio signals in various formats (e.g., mono, stereo, immersive, binaural, and other suitable formats).

The communication unit 909 is configured to communicate with other devices (e.g., via a network). A drive 910 is also connected to the I/O interface 905, as required. A removable medium 911, such as a magnetic disk, an optical disk, a magneto-optical disk, a flash drive or another suitable removable medium is mounted on the drive 910, so that a computer program read therefrom is installed into the storage unit 908, as required. A person skilled in the art would understand that although the system 900 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 909, and/or installed from the removable medium 911, as shown in FIG. 9.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 9), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of estimating a noise floor of an audio signal, the method comprising:

obtaining, using one or more processors, the audio signal;

dividing, using the one or more processors, the audio signal into a plurality of buffers;

determining, using the one or more processors, time-frequency samples for each buffer of the audio signal;

for each buffer and for each frequency, determining, using the one or more processors, a median or mean and a measure of an amount of variation of energy based on the samples in the buffer and samples in neighboring buffers that together span a specified time range of the audio signal;

combining, using the one or more processors, the median or mean and the measure of the amount of variation into a cost function;

for each frequency:

determining, using the one or more processors, a signal energy of a particular buffer of the audio signal that corresponds to a minimum value of the cost function;

selecting, using the one or more processors, the signal energy as the estimated noise floor of the audio signal; and reducing, using the one or more processors and the estimated noise floor, noise in the audio signal.

2. The method of claim 1, wherein the measure of the amount of variation of energy and median or mean are scaled between 0.0 and 1.0.

3. The method of claim 1, wherein the cost function increases for increasing median or mean and increases for an increasing measure of the amount of variation of energy.

4. The method of claim 1, wherein the cost function is non-linear.

5. The method of claim 1, wherein the cost function is symmetric in the measure of the amount of variation and mean or median.

6. The method of claim 1, wherein the cost function is asymmetric, and the measure of the amount of variation of energy is weighted less than the mean or median when the measure of the amount of variation of energy is smaller than a predefined threshold.

7. The method of claim 1, wherein the measure of the amount of variation of energy is:

a standard deviation; or a difference between a maximum value of the energy across the buffers in the specified time range and a minimum value of the energy across the buffers in the specified time range.

8. The method of claim 7, wherein the combination of the measure of the amount of variation and mean or median is the sum of their values plus an inverse of the sum of their product and 1.

9. The method of claim 7, wherein the combination of the measure of the amount of variation and the median or mean is the sum of their square values.

10. The method of claim 7, wherein the combination of the measure of the amount of energy and median or mean is the square of the median or mean and a sigmoid of the measure of the amount of variation.

11. The method of claim 7, wherein the combination of the measure of the amount of variation and median or mean is the sum of the median or mean and a sigmoid of the measure of the amount of variation.

12. The method of claim 7, wherein, if one or more of the buffer and the neighboring buffers that together span the specified time range of the audio signal has an overall signal energy below a predefined threshold, the buffer and the neighboring buffers that together span the specified time range of the audio signal are not used in estimating the noise floor of the audio signal.

13. The method of claim 12, wherein the predefined threshold is determined relative to a maximum level of the audio signal, or wherein the predefined threshold is determined relative to an average level of the audio signal.

14. The method of claim 7, further comprising:
- analyzing, using the one or more processors, a distribution of chunks of the audio signal from which the noise floor is estimated at each frequency;
- selecting a chunk k and a frequency f;
- replacing an estimated noise at the frequency f with a value computed from chunk k if the increased cost is smaller than a second predefined threshold.

15. The method of claim 1, further comprising:
- determining a confidence value from a value of the measure of the amount of variation at the selected buffer.

16. The method of claim 15, wherein the confidence value is smoothed across frequency.

17. The method of claim 15, wherein reducing noise in the audio signal, further comprises:
- applying a gain reduction at each frequency that is reduced as a function of the confidence value at the frequency.

18. The method of claim 1, further comprising:
- selecting, using the one or more processors, a frequency $f_1$;
- computing, using the one or more processors, averages of discrete derivatives of the frequency spectrum in blocks of predefined size for all intervals of a predetermined size above the selected frequency $f_1$;
- selecting, using the one or more processors, a block with a largest negative derivative as a cut-of frequency $f_c$, if such negative value is smaller than a predefined value; and
- replacing, using the one or more processors, values of the frequency spectrum above the cut-off frequency with an average of the frequency spectrum in a frequency band of predefined length having an upper boundary that is adjacent to the cut-off frequency.

19. A system comprising:
- the one or more processors; and
- a non-transitory computer-readable medium storing instructions that, upon execution by the one or more processors, cause the one or more processors to perform operations of the method claim 1.

20. A non-transitory, computer-readable medium storing instructions that, upon execution by the one or more processors, cause the one or more processors to perform operations of the method claim 1.

* * * * *